(12) United States Patent  
Knox (10) Patent No.: US 6,525,750 B1
(45) Date of Patent: *Feb. 25, 2003

(54) PROJECTION DISPLAY FOR COMPUTERS

(75) Inventor: Richard M. Knox, Houston, TX (US)

(73) Assignee: Duke University, Durham, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/615,019

(22) Filed: Mar. 8, 1996

(51) Int. Cl.[7] ................................................ G06F 1/16
(52) U.S. Cl. ................... 345/901; 345/905; 361/681
(58) Field of Search .................. 345/32, 905, 759–768, 345/788, 7 CT, 901; 348/759–768, 788, 794; 349/5, 6, 576; 353/30, 70; 463/34; 361/681

(56) References Cited

U.S. PATENT DOCUMENTS

| | | | |
|---|---|---|---|
| 4,234,894 A | * 11/1980 | Tokumaru et al. | 348/784 |
| 4,799,137 A | 1/1989 | Aho | 362/309 |
| 4,874,228 A | 10/1989 | Aho et al. | 350/345 |
| 4,971,312 A | * 11/1990 | Weinreich | 472/63 |
| 5,054,885 A | 10/1991 | Melby | 359/618 |
| 5,060,152 A | * 10/1991 | Maeser et al. | 364/401 |
| 5,083,857 A | 1/1992 | Hornbeck | 359/291 |
| 5,091,873 A | * 2/1992 | Araki | 364/708 |
| 5,122,905 A | 6/1992 | Wheatley et al. | 359/586 |
| 5,122,906 A | 6/1992 | Wheatley | 359/586 |
| 5,148,157 A | 9/1992 | Florence | 340/783 |
| 5,190,370 A | 3/1993 | Miller et al. | 362/340 |
| 5,225,823 A | 7/1993 | Kanaly | 340/793 |
| 5,233,385 A | 8/1993 | Sampsell | 355/35 |
| 5,313,479 A | 5/1994 | Florence | 372/26 |
| 5,355,279 A | * 10/1994 | Lee et al. | 361/681 |

(List continued on next page.)

FOREIGN PATENT DOCUMENTS

| | | | |
|---|---|---|---|
| EP | 0617354 A1 | * 9/1994 | G06F/1/16 |
| WO | 94/29768 | 12/1994 | G03B/21/62 |

OTHER PUBLICATIONS

"Chapter 8 –Liquid Crystal Displays," pp. 181–251.

Nitto Optical Co., Ltd., "Optics for Image Disposition Systems," p. 9. (undated brochure).

Baur, T. et al., "High Performance Liquid Crystal Device Suitable for Projection Display," SPIE vol. 2650, pp. 226–228 (Jul. 1996).

Displaytech, Inc. "FLC/VSLI Display Technology" (Dec. 1, 1995).

(List continued on next page.)

Primary Examiner—Andrew Faile
Assistant Examiner—Vivek Srivastava
(74) Attorney, Agent, or Firm—Fleshner & Kim, LLP (57) ABSTRACT

A display system for a computer includes an image projector located in the computer and oriented to project a computer-generated image from the computer. Alternatively, the display system includes a screen and an image projector attached to the screen, where the screen is capable of receiving a computer-generated image projected by the image projector. Alternatively, the display system includes an image projector and a screen that is attached to the computer and that is capable of displaying an image projected by the image projector.

14 Claims, 6 Drawing Sheets

U.S. PATENT DOCUMENTS

| | | | |
|---|---|---|---|
| 5,359,550 A | * 10/1994 | Chen | 364/708.1 |
| 5,373,333 A | * 12/1994 | Kawada et al. | 353/122 |
| 5,381,309 A | 1/1995 | Borchardt | 362/31 |
| 5,404,076 A | 4/1995 | Dolan | 313/572 |
| 5,404,171 A | 4/1995 | Golstein et al. | 348/459 |
| 5,416,618 A | 5/1995 | Juday | 359/53 |
| 5,453,859 A | 9/1995 | Sannohe et al. | 359/63 |
| 5,467,146 A | 11/1995 | Huang et al. | 348/743 |
| 5,467,154 A | 11/1995 | Gale et al. | 353/77 |
| 5,471,584 A | 11/1995 | Blaxtan et al. | 359/263 |
| 5,483,250 A | * 1/1996 | Herrick | 345/32 |
| 5,486,949 A | 1/1996 | Schrenk et al. | 359/498 |
| 5,504,391 A | 4/1996 | Turner et al. | 313/570 |
| 5,508,841 A | 4/1996 | Lin et al. | 359/318 |
| 5,510,806 A | * 4/1996 | Busch | 345/87 |
| 5,521,660 A | * 5/1996 | Hodson et al. | 353/122 |
| 5,523,881 A | 6/1996 | Florence et al. | 359/561 |
| 5,555,324 A | 9/1996 | Waxman et al. | 382/254 |
| 5,557,343 A | 9/1996 | Yamagishi | 348/781 |
| 5,563,738 A | 10/1996 | Vance | 359/614 |
| 5,573,324 A | 11/1996 | De Vaan | 353/77 |
| 5,594,591 A | 1/1997 | Yamamoto et al. | 349/5 |
| 5,606,220 A | 2/1997 | Dolan et al. | 313/637 |
| 5,612,820 A | 3/1997 | Schrenk et al. | 359/498 |
| 5,626,800 A | 5/1997 | Williams et al. | 264/1.38 |
| 5,642,129 A | 6/1997 | Zavracky et al. | 345/100 |
| 5,670,842 A | 9/1997 | Dolan et al. | 313/570 |
| 5,682,080 A | 10/1997 | Dolan et al. | 313/570 |
| 5,686,793 A | 11/1997 | Turner et al. | 313/570 |
| 5,692,820 A | 12/1997 | Gale et al. | 353/119 |
| 5,828,427 A | * 10/1998 | Faris | 349/5 |

OTHER PUBLICATIONS

Gambogi, W., et al., "HOE Imaging in DuPont Holographic Photopolymers," Proc. SPIE, "Diffractive and Holographic Optics Technology," vol. 2152 (1994).

Gambogi, W.J. et al., "Advances and Applications of DuPont Holographic Photopolymers," Optics Quebec '93, Conf. 2043, "Holographic Imaging and Materials" (Aug. 1993).

Gambogi, W.J. et al., "Color Holography Using DuPont Holographic Recording Films," Proc. SPIE "Holographic Materials," vol. 2405 (Feb. 1995).

Gambogi, W.J. et al., "Diffractive Printing Methods Using Volume Holograms," IS&T/SPIE 1993 Int'l Conf. on Electronic Imaging, conf. 1914 (1993).

Gambogi, W.J. et al., "Holographic Transmission Elements Using Improved Photopolymer Films," SPIE vol. 1555 Computer and Optically Generated Holographic Optics (Fourth in a Series), pp. 256–266 (1991).

Bennett, Jean M. Handbook of Optics, vol. II, Devices, Measurements, and Properties, "Chapter 3 –Polarizers" (1995).

Jack M. Younse, "Projection Display Systems Based on the Digital Micromirror Device (DMD)," SPIE Proceedings Reprint, vol. 2641, pp. 64–75 (Jul. 1995).

Joubert, C. et al., "Dispersive Holographic Microlens Matrix for Single LCD Projection" SPIE vol. 2650, pp. 243–252 (Jul. 1996).

Larry J. Hornbeck, "Digital Light Processing and MEMS: Timely Convergence for a Bright Future," presented at Micromachining and Microfabrication '95 (Oct. 23–24, 1995).

Parfenov, A.V. and Putilin, A.N., "An Advanced Optical Schemes with Liquid Crystal Image Converters for Display Applications," SPIE vol. 2650, pp. 173–179 (Jul. 1996).

Tipton, D. et al., "Improved Process of Reflection Holography Replication and Heat Processing," Proc. SPIE, "Practical Holography VIII, Materials and Processing," vol. 2176 (Feb. 1994).

Weber, A.M. et al., "Hologram Recording in DuPont's New Photopolymer Materials," Practical Holography IV, SPIE OE/Lase Conference Proceedings, 1212–04 (Jan. 1990).

Pohl, Ludwig et al., Liquid Crystals –Applications and Uses, pp. 139–170, 231–274 (1990).

Website: Applications of PDLCs http://abalone.cwru.edu/tutorial/enhanced/files/pdlc/apps/apps.html.

Website: New Flat Panel Display Technologies http://mambo.ucsc.edu/psl/cis_seminars/119610/19961017.html.

Website: Polymer Dispersed Liquid Crystals http:www-.bell–labs.com/new/gallery/pdlc.html.

Website:Polymer–dispersed LCDs http://stephen.www.media.mit.edu/people/st...ls/node9.htm (May 18, 1995).

Website: Worldwide Flat Panel Display Markets and Trends http://www.electronictrendpubs.com/fpd.htm (Mar. 1996).

* cited by examiner

PROJECTION DISPLAY FOR COMPUTERS

BACKGROUND

The invention relates to a projection display for computers.

Portable computers, such as laptops, generally use liquid crystal diode (LCD) panels to display computer generated images to a user. LCD panels are thin, lightweight devices that require relatively little power and therefore are particularly well-suited for portable applications.

Figure 1:
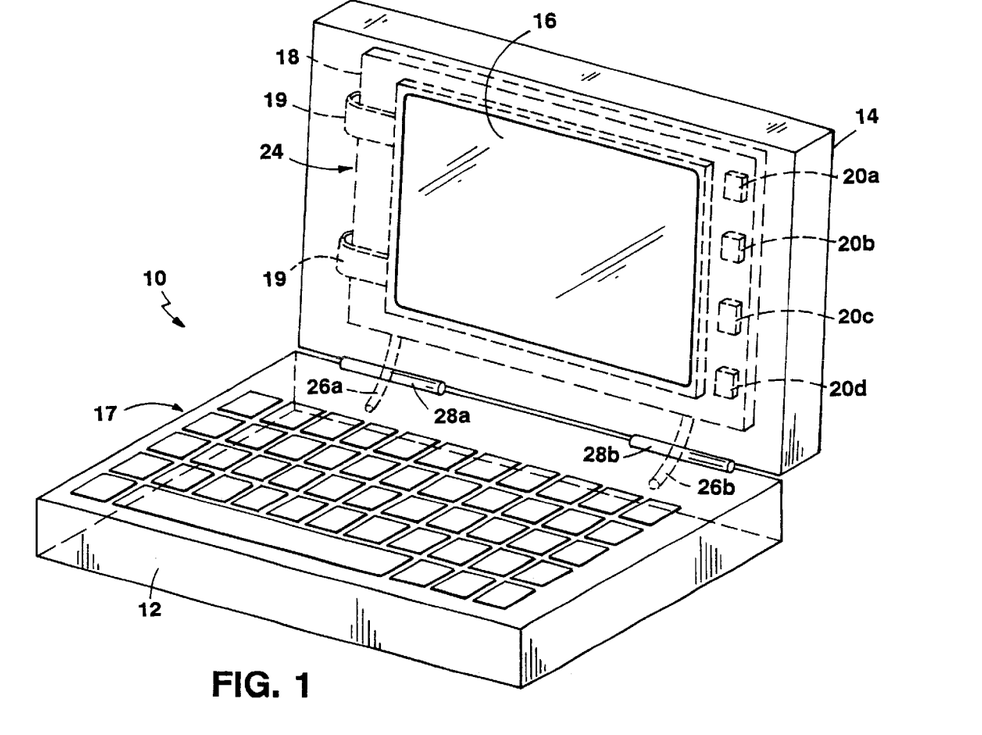
FIG. 1 is a perspective view of a laptop computer.

Referring to FIG. 1, a laptop computer 10 includes a base 12 housing, which houses most of the computer's electronics and input/output (I/O) devices, such as keyboard 17. The computer 10 also includes a hinged lid 14 that includes an LCD panel 16. Because the LCD panel 16 is an active electronic device, it is driven by electronic drivers 20a–20d that, along with the LCD panel 16 and several circuit boards (e.g., flex circuits 19), are mounted on a frame 18 to form a display subsystem 24. Images displayed on the LCD panel 16 cover only a portion of the total area of the lid 14 (e.g., typically between 50% and 60%). The laptop 10 also includes cables 26a, 26b that run between the base 12 and the lid 14 to connect the display subsystem 24 to the video controller (not shown in FIG. 1).

Figure 2:
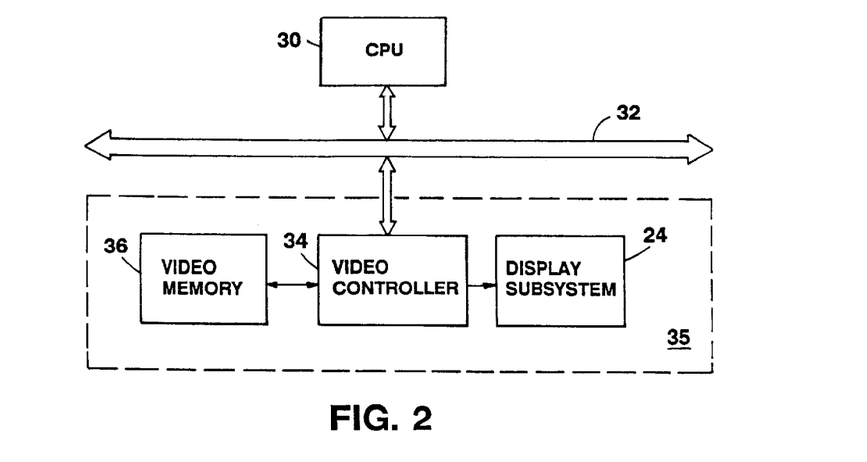
FIG. 2 is a block diagram of a conventional computer video subsystem.

Referring to FIG. 2, most computers include a central processor 30 that generates data and transmits the data to a video subsystem 35 over a bus 32. The video subsystem 35 includes a video controller 34, which is connected to the bus 32, that converts the data into image data and stores the image data to a memory device 36. At appropriate times, the video controller 34 retrieves the image data from memory 36 and uses it to control the display subsystem 24. When the display subsystem 24 includes an LCD panel, the video controller 34 must be an LCD controller.

SUMMARY

In one aspect, the invention features a computer having a base housing containing at least one electronic component of the computer and an image projector in the base housing capable of projecting a computer-generated image. The computer may include a screen, which may be attached to the base housing, that is capable of displaying the projected image.

In another aspect, the invention features a computer having a base housing containing at least one electronic component of the computer, a screen, and an image projector attached to the screen (which may be attached to the base housing), where the screen is capable of displaying a computer-generated image projected by the image projector.

In another aspect, the invention features a computer having a base housing containing at least one electronic component of the computer, an image projector capable of projecting a computer-generated image, and a screen attached to the base housing that is capable of displaying the image.

Embodiments of the invention may include one or more of the following features. The electronic component may be the computer's central processor or a keyboard. The image projector may be an LCD projector. The screen may be detachable from the base housing, and it may form a hinged lid for the computer. The screen may not be connected to any portion of the base by wires. The projected image may fill essentially the entire screen. The image may be projected onto a front surface or a rear surface of the screen. The screen may be a rear-projection screen, an angle transforming screen, or a front projection screen. The image projector may be oriented to project an image beam, away from the screen, and the computer may include a reflective surface positioned to reflect the image beam toward the screen. The reflective surface may be attached to the screen and may be detachable. A locking hinge may attach the reflective surface to the screen. The reflective surface may be a mirror, such as a magnifying mirror positioned to cause the projected image to fill essentially the entire screen. The mirror may extend from the base and may be retractable into the base.

In another aspect, the invention features a computer having a central processing unit, an image projector, and a screen all in a self-contained unit.

In another aspect, the invention features a computer having a base housing containing at least one electronic component of the computer and a screen, mechanically attached to the base housing, that displays a computer generated image. No electronic component in the base housing is connected to the screen by wires carrying image data.

In another aspect, the invention features a display system for a computer having an image projector located in the computer and oriented to project a computer-generated image from the computer.

In another aspect, the invention features a display system for a computer having a screen and an image projector attached to the screen, where the screen is capable of receiving a computer-generated image projected by the image projector.

In another aspect, the invention features a display system for a computer having an image projector and having a screen that is attached to the computer and is capable of displaying a computer-generated image projected by the image projector.

In another aspect, the invention relates to a method of displaying a computer-generated image by generating the image in the computer and projecting the image from the computer to display the image.

In another aspect, the invention features a method of displaying a computer-generated image by projecting the image from an image projector attached to a screen and displaying the image on a surface of the screen.

In another aspect, the invention features a method of displaying a computer-generated image by projecting the image from an image projector and displaying the image on a screen attached to the computer.

Advantages of the invention may include one or more of the following. Computer displays may be thinner and more lightweight than conventional LCD panels. All or nearly all of the surface area of a laptop computer's lid may be used to display images generated by the computer, which may allow larger images or smaller lids, or both. The images also may be displayed on a wall or on another surface not attached to the computer. Because all of the video electronics may be placed in the computer's base, no cables must run between the base and the screen.

Other features and advantages will become apparent from the following description and from the claims.

DESCRIPTION

Figure 3A:
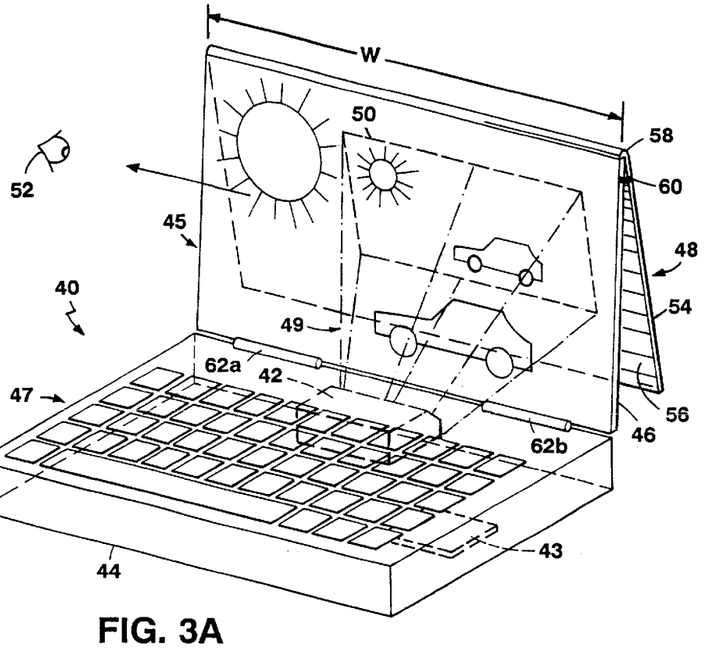
FIGS. 3A and 3B are perspective and side views, respectively, of a laptop computer with a rear projection display.
Figure 3B:
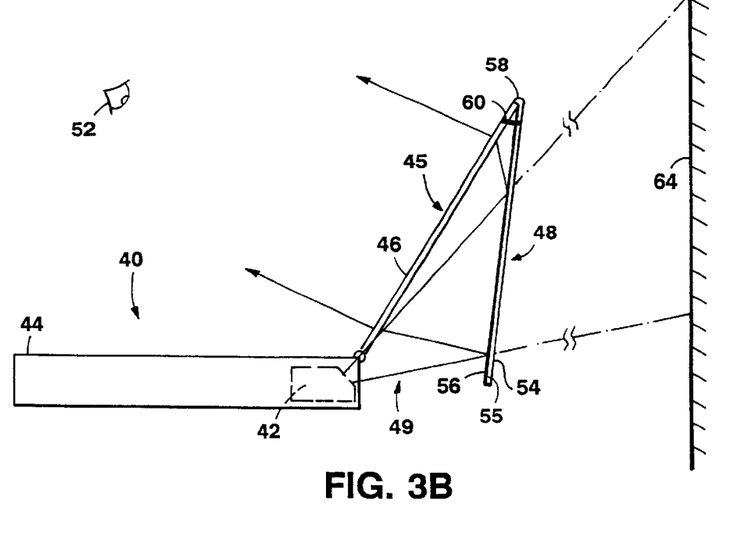

Referring to FIGS. 3A and 3B, image projection is used to improve the display qualities of a computer 40, including but not limited to a portable (e.g., laptop) computer or any other self-contained computer (i.e., a computer in which the central processor and the display reside in a common housing or in attached housings). Instead of an LCD panel and the accompanying electronics, the computer 40 includes a base housing 44 containing an image projection engine 42 (as well as a microprocessor 43 and an alphanumeric input device, such as a keyboard 47) and a lid 45 comprising a rear projection screen 46 and a reflective flap 48. The projection engine 42 projects an image beam 49 containing an image 50 onto the reflective flap 48, which in turn reflects the beam 49 toward the screen 46. When the beam 49 impinges upon the screen 46, the screen 46 transmits the image 50 toward the user. To insure that the image 50 is directed toward the user 52 regardless of the angle at which the beam 49 hits the screen 46, the screen 46 must be an angle transforming screen, such as the Microsharp™ screen made by Nashua Corporation, which is used to produce wide angle viewing screens.

The reflective flap 48 includes a body 54, which is made of a relatively rigid material such as hard plastic to protect the screen when the lid 45 is closed, and a reflective layer 56, such as a mirror or other optically reflective material, that covers the front surface 55 of the body 54. The reflective layer 56 may be attached to the body 54 by any suitable means, such as an adhesive glue.

The flap 48 is mounted to the screen 46 by a hinge 58 that spans most of the width W of the screen 46 or, alternatively, by multiple hinges (not shown) distributed across the width W of the screen 46. Preferably, the flap 48 is detachable from the lid 45 so that the image 50 may be displayed on a wall 64 (FIG. 3B) or any other surface that is not attached to and/or is distant from the computer 40. Likewise, the lid 45 is mounted to the base 44 by hinges 62a, 62b.

When the lid 45 is fully opened, the screen 46 and the reflective flap 48 must mechanically articulate such that the optical path from the projection engine 42 to the screen 46 keeps the image 50 on the screen 46, in focus, and properly sized. This may be accomplished, e.g., by using hinges with mechanical stops that lock the hinges 58, 62a, 62b when the lid 45 is fully opened. For the reflective flap 48, a releasable latch 60 may be used in lieu of or in addition to the locking hinge 58 to control the position of the flap 48. When the screen 46 and the flap 48 are positioned properly, the image 50 fills essentially all of the screen's surface (e.g., between 90% and 100% of the surface).

Figure 4:
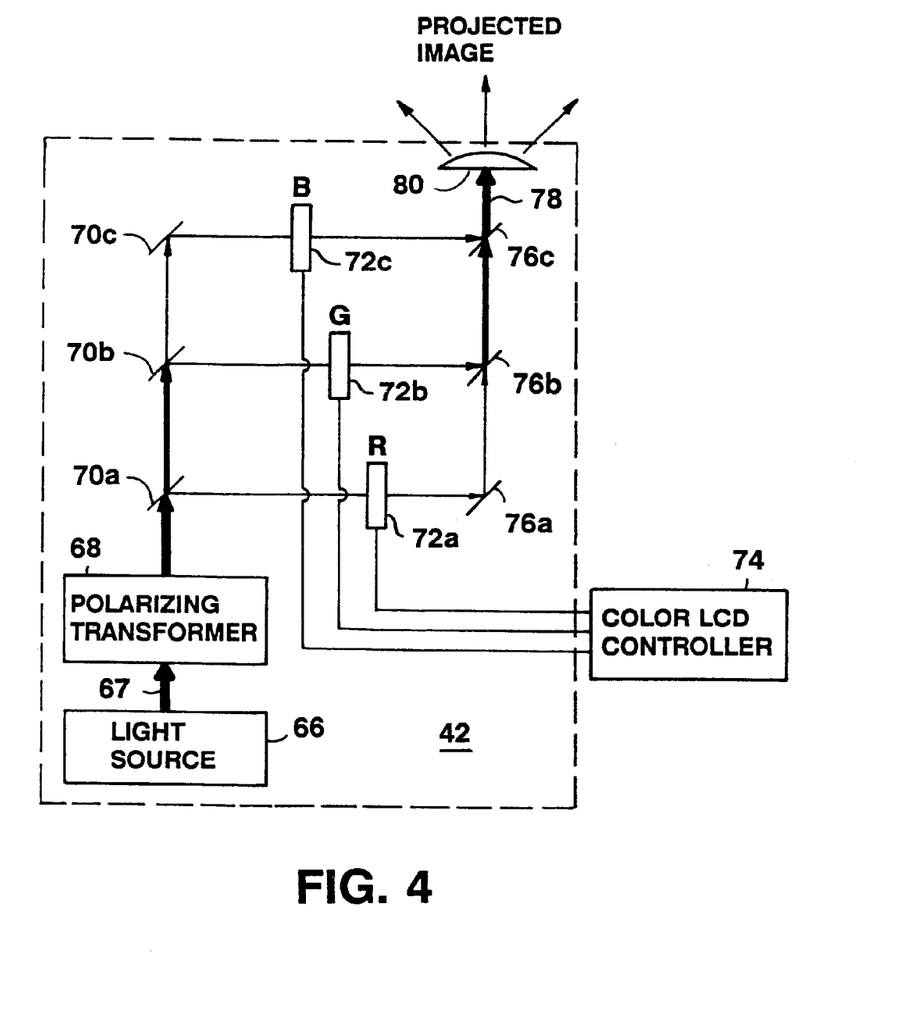
FIG. 4 is a schematic view of a standard three cell image projector.

Referring to FIG. 4, the projection engine 42 is a standard three cell, color, LCD projector reduced to a scale small enough for portable applications. For a laptop computer, the dimensions of the projection engine should be approximately 1.0"×1.0"×2.5" but may differ depending upon the application.

Light in the projection engine is generated by a light source 66 that emits a light beam 67 having wavelengths in at least the red, green, and blue ranges. A light source that produces light ranging from infrared to ultraviolet wavelengths also may be used. When light is emitted from the source 66, the light passes through a polarizer 68, which polarizes the light at each wavelength to the angle required by the LCD cells (discussed below) in the projection engine 42. The required polarization angle depends upon the types of LCD cells (light valves) used.

The polarized light then encounters a series of dielectric coated optical devices 70a–70c that act as reflective bandpass filters (i.e., each device reflects substantially all light in a given frequency band and transmits substantially all other light). The first filter 70a, which reflects red light and transmits substantially all other wavelengths, is positioned to direct red light toward a first light valve 72a, described below. Likewise, the second filter 70b reflects substantially all green light toward a second light valve 72b and transmits substantially all other light. The third filter 70c in turn reflects substantially all remaining blue light toward a third light valve 72c.

After the red, green, and blue wavelengths are separated, the light in each range is filtered by the corresponding light valve 72a–72c. Each light valve 72a–72c is a standard transmissive LCD cell scaled to a size small enough for portable applications (e.g., typically having approximately a 1.3" diagonal). Each LCD cell 72a–72c comprises an array of pixels (e.g., 800×600 pixels, 1024×768 pixels, etc.) controlled by a video subsystem that includes a standard color LCD controller 74. As light of each color passes through the corresponding light valve 72a 72c, the LCD controller 74 alters the properties of the liquid crystal elements at each pixel to appropriately attenuate the magnitude of the corresponding color at the pixel. The light emerging from the light valves 72a–72c then encounters a second set of reflective bandpass filters 76a–76c that recombine the filtered light into a single image beam 78. The color and brightness of the image 78 at each pixel is determined by the combined output of the light valves 72a–72c at the pixel.

Before the image leaves the projection engine 42, it typically passes through magnifying optics 80. The required magnification value of the optics 80 is determined by three factors: 1) the size of the LCD cells in the projection engine, 2) the surface area of the screen, and 3) the optical path length between the projection engine and the screen (i.e., the distance from the engine to the flap plus the distance from the flap to the screen). As described above, the lens must magnify the image at a rate that allows the image to fill all or nearly all of the screen (see FIGS. 3A and 3B). In addition, the projection engine 42 must project the image so that it is properly aligned with the screen. Distortion correction optics (e.g., Keystone optics) may be used correct distortions in the image.

Projection engines other than a standard three cell engine also may be used. For example, the image projector may be a standard reflective polymer dispersed liquid crystal (PDLC) engine, a single filter sub-pixelated LCD engine, a single filter sub-pixelated engine with a color separator, or a color stack engine (i.e., a subtractive color system), all of which are known in the art.

Figure 5A:
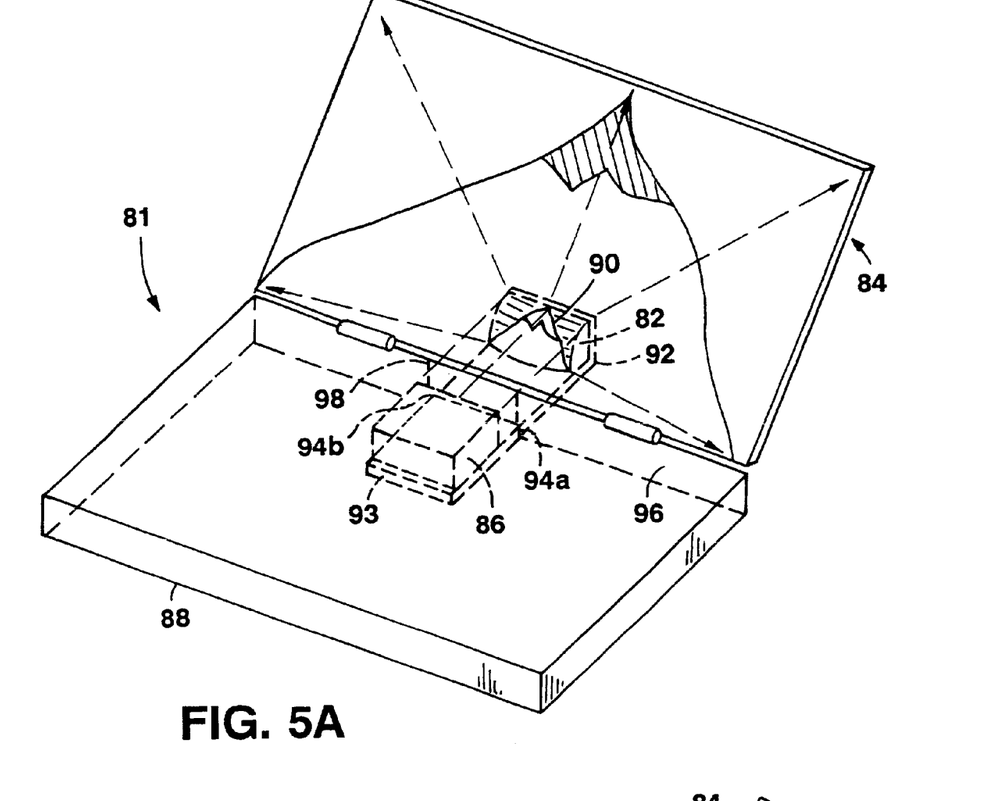
FIGS. 5A and 5B are perspective and side views, respectively, of a laptop computer with a rear projection display.
Figure 5B:
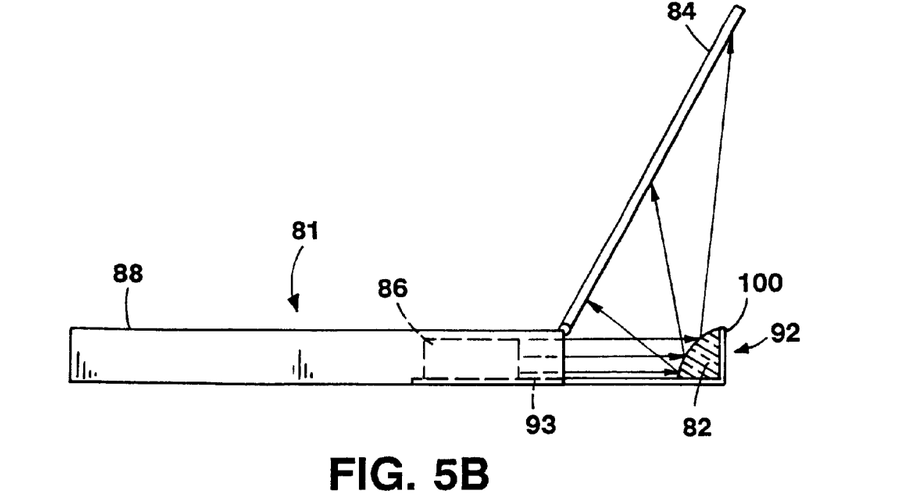

Referring to FIGS. 5A and 5B, a mirror 82 may be used instead of a reflective flap to reflect images onto the screen 84 of a portable computer 81. A projection engine 86 in the base 88 of the computer 81 projects an image 90 toward the mirror 82. The mirror 82 in turn reflects the image 90 toward the screen 84. If the mirror 82 has optical power (i.e., is a rounded or magnifying mirror), it may magnify the image 90 to fill essentially all of the screen. The required magnification and thus the mirror's shape are determined by four factors: 1) the size of the LCD cells in the projection engine, 2) the surface area of the screen, 3) the optical path length from the mirror to the screen, and 4) the magnification rate of other power elements that may be in the optical path.

The magnifying mirror 82 mounts to a retractable tray 92 that slides through a slot 93 in the base 88 of the computer 81. The slot 93 is wider than the tray so that teeth 94a, 94b may protrude from the tray 92. When the tray 92 is fully extended, the teeth 94a, 94b abut the rear wall 96 of the computer 81 to prevent the tray 92 from exiting the base 88 entirely.

The projection engine 86, which is housed in the base 88 of the computer 81, projects light through an opening 98 in the rear wall 96 toward the mirror 82 when the tray 92 is extended. When the tray 92 retracts into the base 88, the mirror 82 enters the opening 98 and occupies the space between the projection engine 86 and the rear wall 96. A back panel 100 of the tray 92 closes the opening 98 and protects the mirror 82 when the tray 92 is in this position.

Figure 6A:
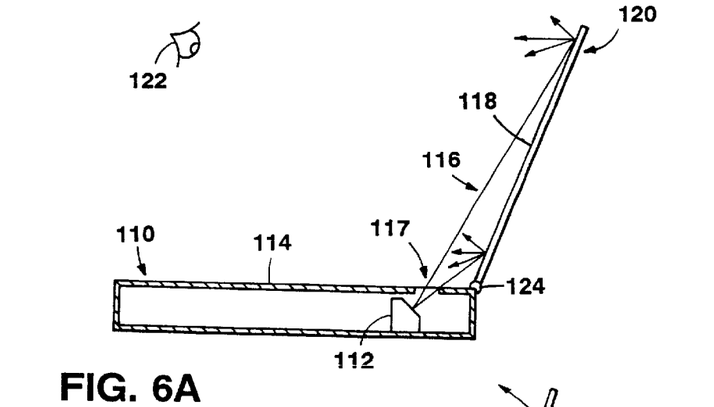
FIGS. 6A, 6B, and 7 are side views of laptop computers with projection displays.
Figure 6B:
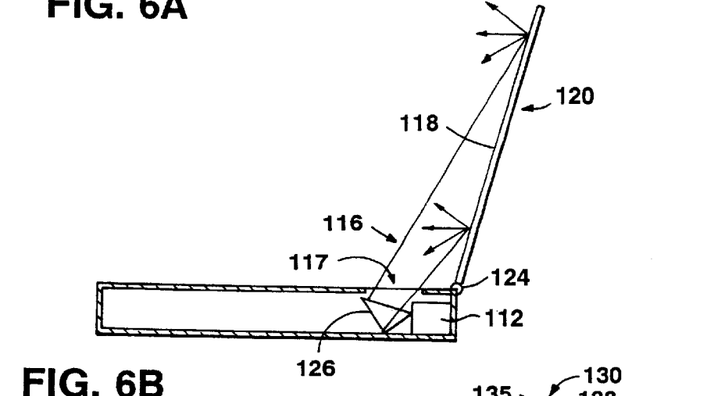

Referring to FIGS. 6A and 6B, front projection may be used instead of rear projection to display computer-generated images. In FIG. 6A, a projection engine 112 located in the base 114 of a laptop computer 110 projects an image beam 116 through an opening 117 in the base 114 and directly onto the front surface 118 of the screen 120. The screen 120, which consists of any suitable reflection-type, refracting material, reflects the image toward the user 122. The projection engine 112 must magnify the image 116 rapidly enough to fill essentially all of the front surface 118 of the screen 120, as discussed above. In addition, the screen 120 should be mounted to the base 114 by a locking hinge 124 to ensure that while the computer is in use, the screen 120 remains at a proper angle to allow the image 116 to fill essentially all of the screen 120 and to prevent any of the image 116 from missing the screen 120 entirely. Distortion correcting optics (e.g., Keystone optics) may be used to correct distortions that may occur in the image 116.

In FIG. 6B, the projection engine 112 initially projects the image beam 116 away from the screen 120 and toward a reflective surface 126, such as a mirror. The mirror 126 in turn reflects the image beam 116 through the opening 117 in the base and onto the front surface 118 of the screen 120. Again, a locking hinge 124 should mount the screen 120 to the base 114 and the magnification rate of the projection engine 112 should be sufficiently large to allow the image to fill essentially all of the front surface 118 of the screen 120. If the mirror 126 is an optical power element (e.g., a magnifying mirror), the mirror itself may magnify the image to fill essentially all of the screen's surface 118.

Figure 7:
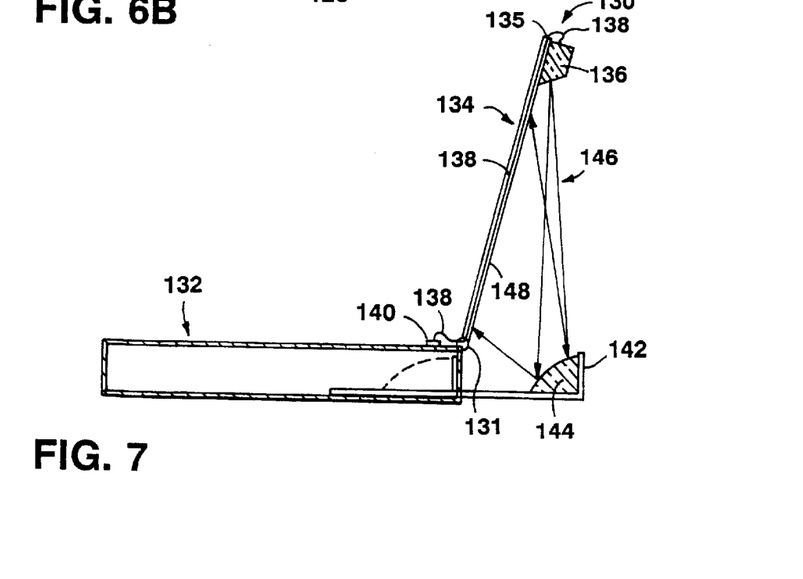

Referring to FIG. 7, a self-contained display assembly 130 mounted by a locking hinge 131 to a laptop computer 132 serves as a lid to the computer 132. The display assembly 130 includes a screen 134 and a projection engine 136 mounted against an edge of the screen. The projection engine 136 receives image data from the computer 132 through a cable 138 that runs along one side of the screen 134 and terminates at a connector 140 that attaches to the computer 132. A retractable tray 142 that extends from the computer 132 holds a magnifying mirror 144.

When the locking hinge 131 holds the display assembly 130 in the fully-opened position, the projection engine 136 projects an image beam 146 toward the magnifying mirror 144. The magnifying mirror 144 in turn reflects the image 146 onto the rear surface 148 of the screen 134, magnifying the image 146 to fill essentially all of the screen 134. When the computer 132 is not in use, the tray 142 may be pushed into the computer 132 to protect the magnifying mirror 144. If the hinge 131 is a detachable hinge, the display assembly 130 may be removed from the computer 132 and used with another computer system.

Figure 8A:
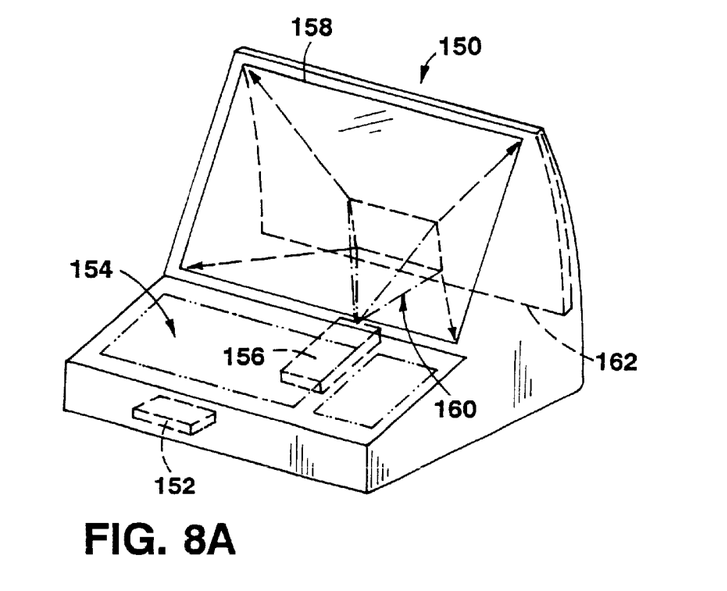
FIGS. 8A and 8B are perspective views of self contained computers each with a single housing and a projection display.
Figure 8B:
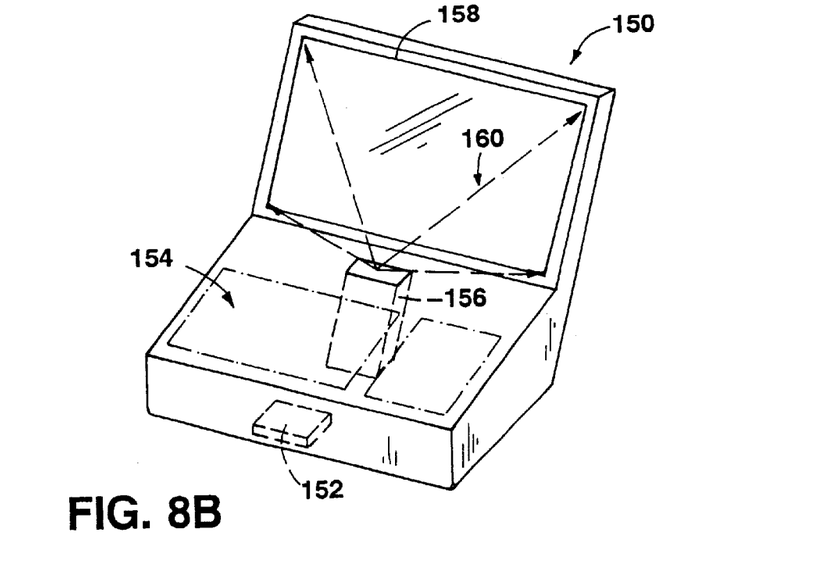

Referring to FIGS. 8A and 8B, image projection may be used in-a self-contained computer 150 having a microprocessor 152, a keyboard 154, an image projector 156, and a screen 158 all in a common housing. Preferably, the projector has a resolution of at least 800×600 pixels and is approximately 1.5" high, 4" wide, and 5" long. In FIG. 8A, the image projector 156 projects an image beam 160 toward a reflective surface 162, which in turns reflects the image beam 160 onto a rear projection screen. In FIG. 8B, the image projector 156 projects the image beam 160 directly onto the front surface of a front projection screen.

Other embodiments are within the scope of the following claims. For example, the light source in the projection engine of FIG. 4 may use color lasers.

What is claimed is:

1. A computer comprising:
    a portable housing having circuitry that generates data corresponding to an image,
    a lid connected to the housing and moveable to an open position relative to the housing, the lid having an image projector disposed therein or thereon, the image projector being configured to project the image optically onto a receiving surface, which comprises a surface of the lid.

2. The computer of claim 1 in which the receiving surface is continuous and comprises the entire surface of the lid.

3. A computer comprising:
    a portable housing having circuitry that generates data corresponding to an image, and
    a lid connected to the housing and movable to an open position relative to the housing, the lid including an image projector configured to project the image optically onto a receiving surface,
    in which the receiving surface comprises a mirror positioned to direct the image toward an imaging surface on the lid.

4. The computer of claim 3 in which the mirror is mounted on a retractable part of the housing.

5. A computer comprising:
    a portable housing having circuitry that generates data corresponding to an image,
    a lid connected to the housing and movable to an open position relative to the housing,
    an image projector included as part of the lid, and
    a mirror positioned to receive the image from the image projector and to reflect the image onto an imaging surface comprising essentially an entire surface of the lid.

6. A method for use in displaying an image in a computer comprising:
    in circuitry located in a portable housing, generating data corresponding to the image, and
    protecting the image onto a receiving surface, which comprises a mirror, from an image projector included as part of a lid that is connected to the housing and that is movable to an open position relative to the housing.

7. A method for use in displaying an image in a computer comprising:

in circuitry located in a portable housing, generating data corresponding to the image, and protecting the image onto a receiving surface, which reflects the image onto a surface of the lid, from an image projector included as part of a lid that is connected to the housing and that is movable to an open position relative to the housing.

8. A computer comprising:

a portable housing having circuitry that generates an image signal, a lid connected to the housing and movable to an open position relative to the housing, such that the lid acts as an imaging screen having front and rear surfaces in relation to the position of a user of the computer, and an image projector positioned such that an image from the projector is projected onto the rear surface of the screen and is viewed by the user on the front surface of the screen, wherein the image projector projects the image onto a reflective surface positioned behind the screen in relation to the user, and wherein the reflective surface is mounted in a tray which is retractable from the portable housing.

9. A computer comprising:

a portable housing having circuitry that generates an image signal, a lid connected to the housing and movable to an open position relative to the housing, such that the lid acts as an imaging screen having front and rear surfaces in relation to the position of a user of the computer, and an image projector positioned such. that an image from the projector is projected onto the rear surface of the screen and is viewed by the user on the front surface of the screen, wherein the image projector projects the image onto a reflective surface positioned behind the screen in relation to the user, and wherein the reflective surface is in the form of a reflective flap connected by a hinge to one end of the lid such that the reflective flap pivots about the hinge from a closed position in which it is disposed against a top of the lid when the lid is in a closed position to an open position in which position the reflective surface acts as the reflective surface.

10. The computer of claim 8, wherein the reflective surface comprises a magnifying mirror.

11. The computer of claim 8, wherein the reflective surface comprises a convex surface.

12. The computer of claim 8, wherein the entire lid acts as the imaging screen.

13. The computer of claim 9, wherein the reflective surface comprises a magnifying mirror.

14. The computer of claim 9, wherein the entire lid acts as the imaging screen.

* * * * *

UNITED STATES PATENT AND TRADEMARK OFFICE
CERTIFICATE OF CORRECTION

PATENT NO. : 6,525,750 B1 Page 1 of 1
APPLICATION NO. : 08/615019
DATED : February 25, 2003
INVENTOR(S) : Richard M. Knox It is certified that error appears in the above-identified patent and that said Letters Patent is hereby corrected as shown below:

1. In claim 6 at column 6, line 62, change the word "protecting" to the word --projecting--;

2. In claim 7 at column 7, line 3, change the word "protecting" to the word --projecting--; and 3. In claim 9 at column 8, line 3, remove the period "." between the words "such" and "that."

Signed and Sealed this

Eleventh Day of December, 2007

JON W. DUDAS
*Director of the United States Patent and Trademark Office*